(12) United States Patent
Katayama

(10) Patent No.: US 7,808,525 B2
(45) Date of Patent: Oct. 5, 2010

(54) TRANSPARENT CAMERA CALIBRATION TOOL FOR CAMERA CALIBRATION AND CALIBRATION METHOD THEREOF

(75) Inventor: Yasuhiro Katayama, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 1446 days.

(21) Appl. No.: 11/052,756

(22) Filed: Feb. 9, 2005

(65) Prior Publication Data

US 2005/0280709 A1    Dec. 22, 2005

(30) Foreign Application Priority Data

Jun. 18, 2004  (JP) .............................. 2004-180403
Dec. 14, 2004  (JP) .............................. 2004-360736

(51) Int. Cl.
*H04N 17/00* (2006.01)

(52) U.S. Cl. .................................................... 348/175

(58) Field of Classification Search ................. 348/175, 348/187–192, 180–181; 382/154, 266
See application file for complete search history.

(56) References Cited

U.S. PATENT DOCUMENTS

| 4,053,934 | A  | * | 10/1977 | Kornreich et al. ........... 348/198 |
| 6,064,757 | A  | * | 5/2000  | Beaty et al. .................. 382/147 |
| 6,072,898 | A  | * | 6/2000  | Beaty et al. .................. 382/146 |
| 6,915,006 | B2 | * | 7/2005  | Beaty et al. .................. 382/145 |
| 6,915,007 | B2 | * | 7/2005  | Beaty et al. .................. 382/145 |
| 6,985,175 | B2 | * | 1/2006  | Iwai et al. .................... 348/187 |
| 7,023,473 | B2 | * | 4/2006  | Iwai et al. .................... 348/187 |
| 7,084,386 | B2 | * | 8/2006  | Bernardini et al. .......... 250/216 |
| 7,151,560 | B2 | * | 12/2006 | Matherson et al. .......... 348/187 |

(Continued)

FOREIGN PATENT DOCUMENTS

JP          5-241626          9/1993

(Continued)

OTHER PUBLICATIONS

Roger Y. Tsai, A Versatile Camera Calibration Technique for High-Accuracy 3D Machine . . . , IEEE Journal of Robotics and Automation, Aug. 1987, pp. 323-344, vol. RA-3, No. 4.

(Continued)

*Primary Examiner*—Paulos M Natnael
(74) *Attorney, Agent, or Firm*—Westerman, Hattori, Daniels & Adrian, LLP

(57) ABSTRACT

The calibration tool of the present invention is a transparent camera calibration tool in which a plurality of indicator points is spatially distributed and fixed, wherein the indicator points are formed as intersecting points of thin wires extended to the frame by varying the position of the thin wires in the thickness direction and the indicator points are formed as groups of intersecting points of thin wires rendered by extending a plurality of parallel thin wire groups in different directions. The indicator groups are arranged in at least two sets in a non-coplanar relationship and embodied by distributing distinguishable minute particles in a transparent raw material or by marks or similar in the surface of the raw material. Further, a plurality of cameras arranged separately from one another are calibrated in the same coordinate system by using the transparent camera calibration tool, plate tools that are added thereto, and light beams.

19 Claims, 13 Drawing Sheets

U.S. PATENT DOCUMENTS

| | | | | |
|---|---|---|---|---|
| 7,321,112 B2 | * | 1/2008 | Stam et al. | 250/216 |
| 2004/0066454 A1 | * | 4/2004 | Otani et al. | 348/188 |
| 2004/0070669 A1 | * | 4/2004 | Aoyama | 348/187 |
| 2005/0117215 A1 | * | 6/2005 | Lange | 359/462 |

FOREIGN PATENT DOCUMENTS

| | | |
|---|---|---|
| JP | 08-043026 | 2/1996 |
| JP | 8-43026 | 2/1996 |
| JP | 8-86613 | 4/1996 |
| JP | 10-104033 | 4/1998 |
| JP | 2001-165846 | 6/2001 |

OTHER PUBLICATIONS

Richard Hartley et al., Multiple View Geometry in Computer Vision, Cambridge University Press, 2000, Table of Contents—p. 16.

Search Reports under Section 17 dated Apr. 13, 2005 & Mar. 27, 2006, issued in corresponding British Patent Application No. GB0502688.5.

Examination Report under Section 18(3) dated Mar. 29, 2006, issued in corresponding British Patent Application No. GB0502688.5.

Lahajnar F et al: "Machine vision system for inspecting electric plates" Computers in Industry, Elsevier Science Publishers. Amsterdam, NL, vol. 47, No. 1, janvier 2002, pp. 113-122.

Prenel et al: "Recent evolutions of imagery in fluid mechanics: From standard tomographic visualization to 3D volumic velocimetry" Optics and Lasers in Engineering, Elsevier, vol. 44, No. 3-4, mars 2006, pp. 321-334.

* cited by examiner

Fig.1-A
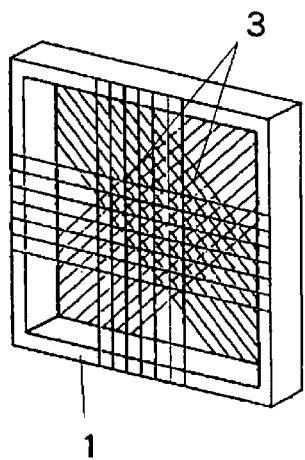
Fig.1-B
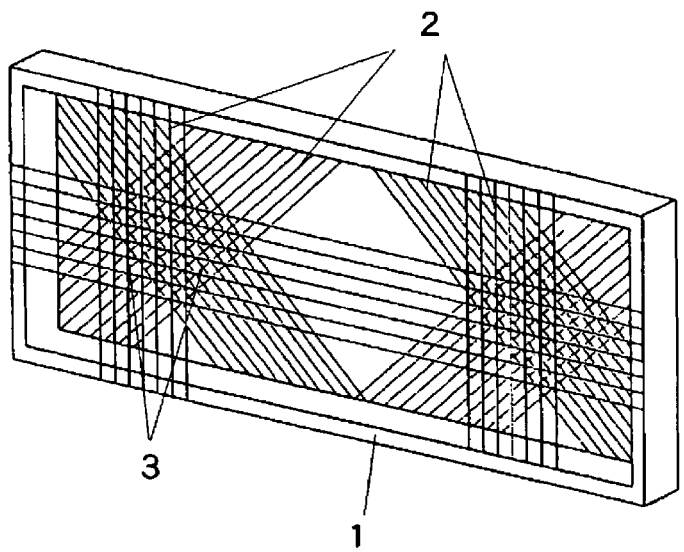
Fig.2-A
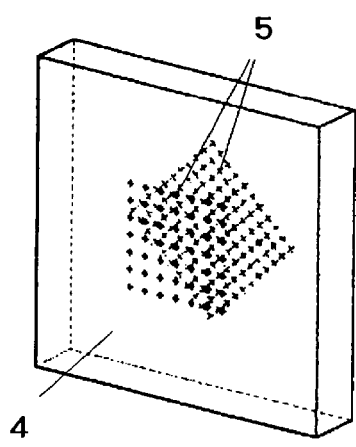
Fig.2-B
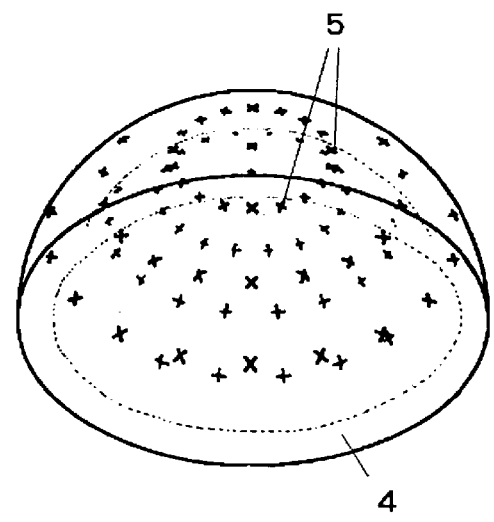

Fig. 8-A
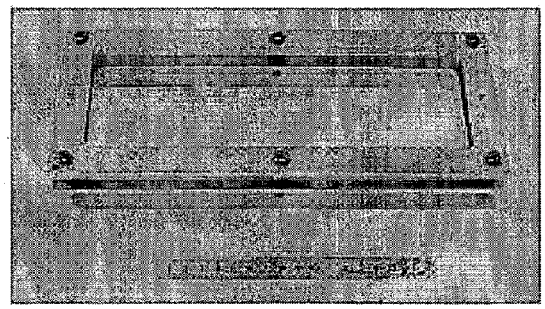
Fig. 8-B
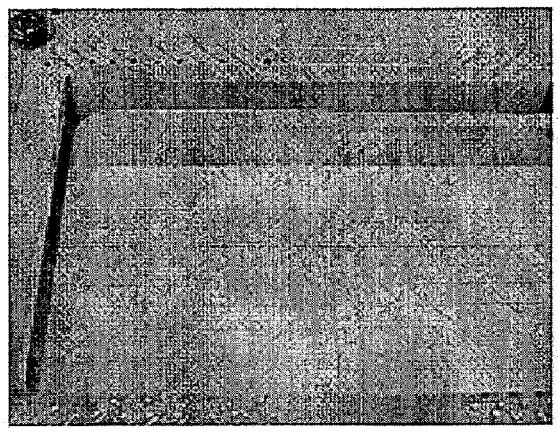
Fig.9  CALIBRATION METHOD
TRANSPARENT CALIBRATION TOOL
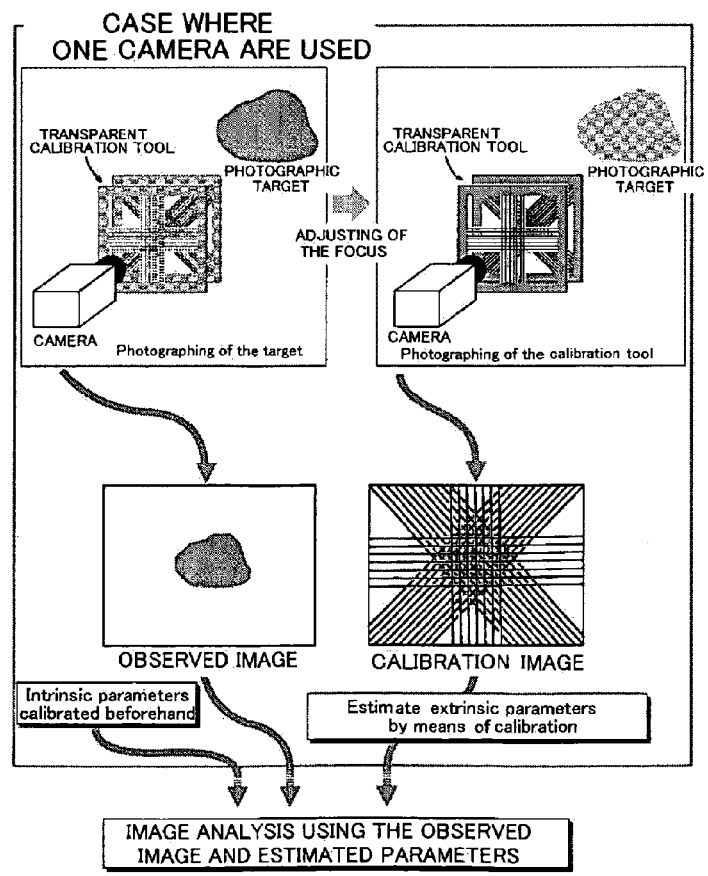

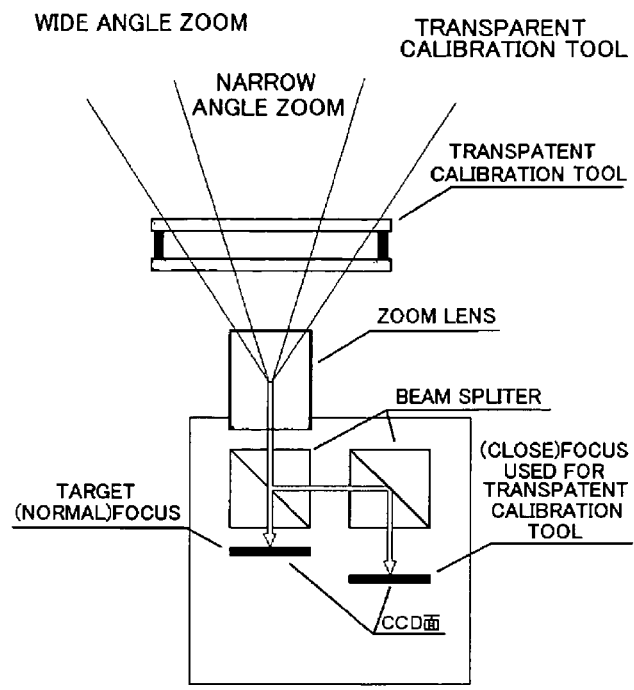
Fig.12    MULTI-FOCUS CAMERA + ZOOM LENS
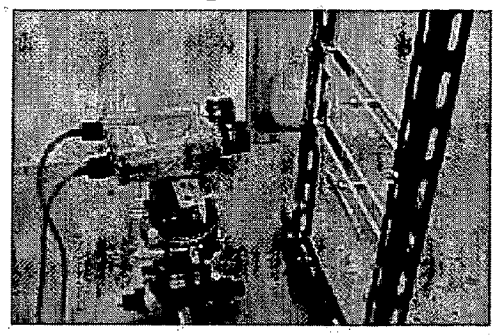
Fig. 13-A
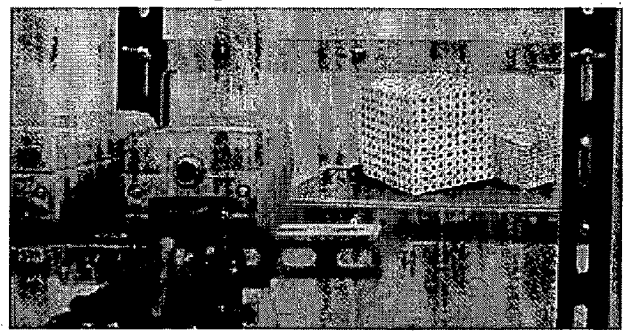
Fig. 13-B

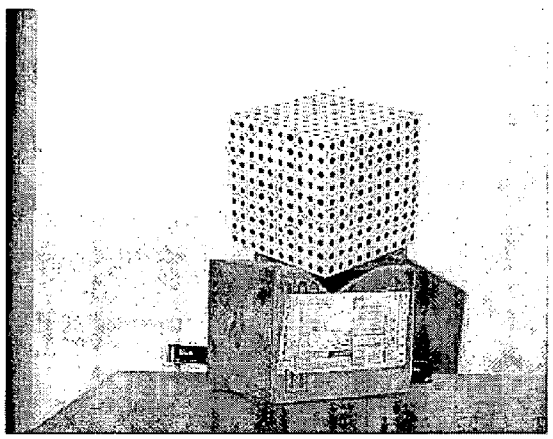
Fig.14-A
Fig.14-B
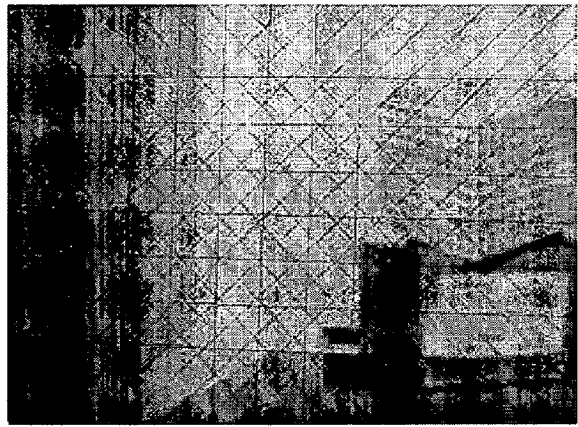
Fig.14-C

Fig.16-A
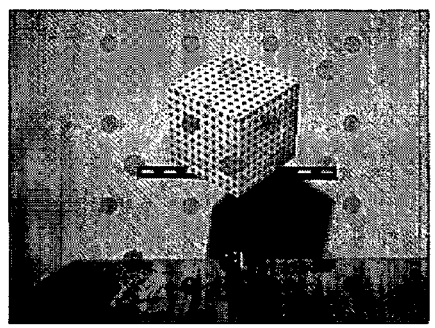
Fig.16-B
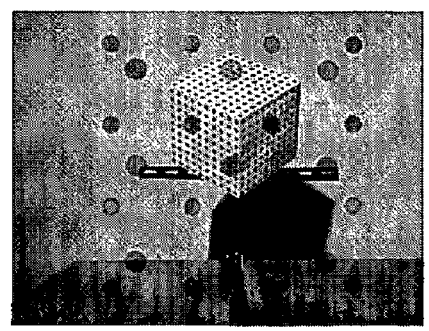
Fig.16-C
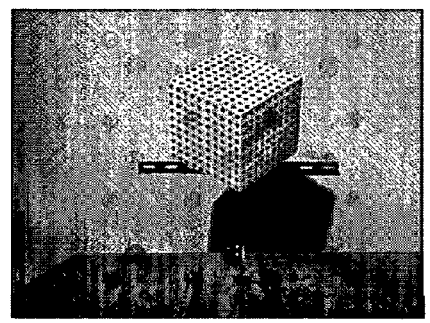
Fig. 17
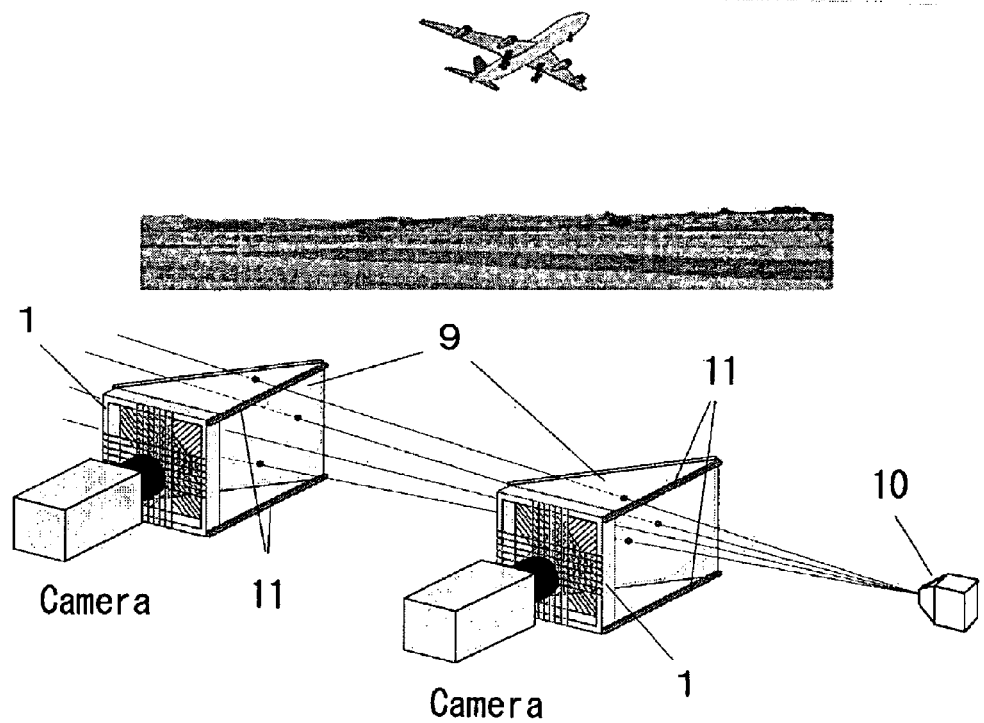

(Prior Art)

Fig. 18  PnP Illustration

TRANSPARENT CAMERA CALIBRATION TOOL FOR CAMERA CALIBRATION AND CALIBRATION METHOD THEREOF

BACKGROUND OF THE INVENTION

1. Field of the Invention

The present invention relates to a transparent camera calibration tool that is employed in camera calibration of computer vision for estimating parameters of six degrees of freedom (extrinsic parameters) for the position and orientation of a camera and parameters (intrinsic parameters) such as the image center position and lens distortion coefficients, which are camera-specific qualities, and to a geometrical calibration method that employs the transparent camera calibration tool.

2. Description of the Related Art

In computer vision, the estimation of extrinsic parameters, which express the relationship between a camera coordinate system and a world coordinate system and intrinsic parameters, which express the relationship between an image coordinate system and the camera coordinate system, is indispensable. It is difficult to determine the position and orientation of a camera on the basis of camera specifications, mounting position information, and so forth, and to determine the focal length from the lens calibration, and so forth, when accuracy is lacking in a real operation and, therefore, generally, camera calibration that entails imaging a calibration tool whose size is already known once and estimating the parameters for the camera position and orientation based on this image is performed. FIG. 20 schematically shows a camera calibration method that uses a conventional calibration tool. First, a calibration tool is disposed close to the object and imaged by means of the camera as a preprocessing to capturing image as shown above on the right, whereupon an image of the calibration tool as shown on the center right is obtained and analyzed and the extrinsic and intrinsic parameters of the camera are calculated and stored. A procedure is adopted in which the calibration tool is withdrawn a certain time afterward, the object is captured as illustrated above on the left to obtain an observed image of the object as shown on the center left, whereupon a three-dimensional analysis of the observed image is carried out on the basis of the previous camera extrinsic and intrinsic parameters. Because an analysis of the observed image is performed on the basis of the camera extrinsic and intrinsic parameters obtained from the calibration tool image in this manner, the position and orientation of the camera and the focal length thereof, and so forth, cannot be changed following calibration.

In the method that is disclosed in Japanese Patent Application Laid Open No. H8-86613 "Stereo camera calibration device" (Apr. 2, 1996), a perforated board c that is rendered by forming a multiplicity of holes b in the upper side of a plate a as shown in FIG. 19 is provided and calibration poles d of rod material are randomly fitted in optional positions of the multiplicity of holes b in the perforated board c. The upper side of plate a is coated black, the upper side of perforated board c is coated gray, and the tops of the calibration poles d are coated white. Further, the lengths of the calibration poles d are set at random. Two cameras (a left camera and right camera) e and f are arranged on top of a calibration table in a cross-eye view so that the optical axes of the left camera e and right camera f are roughly joined at a certain point on the calibration table. An image of the upper side of the calibration table is taken by left camera e and right camera f. The images taken by the left camera e and right camera f are inputted to a coordinate circuit and coordinates are established by the coordinate circuit on the basis of the shading of the images. The information of the coordinate circuit is then inputted to a three-dimensional position processing circuit and calibration parameters estimated by a calibration parameter processing circuit are inputted to the three-dimensional position processing circuit. The three-dimensional position processing circuit determines a three-dimensional position of a projected point based on the information of the coordinate circuit and calibration parameters. This method is favorable in the case of image pickup of a stationary object but requires a device for moving the camera accurately in order to track a moving image of a person or the like by means of a camera. There is also the problem that, because the calibration tool is installed and withdrawn, same is not suited to an outdoor application or the like.

Furthermore, a correction method in a case where a moving object is tracked is also illustrated in Japanese Patent Application Laid Open No. H5-241626 ('Detected Position Correction method', published on Sep. 21, 1993). When the details of Japanese Patent Application Laid Open No. H5-241626 are reviewed, calibration data (CDA), which is obtained by means of calibration in a position A prior to moving the camera, and calibration data (CDB) in position B after the camera has been moved by means of a calculation from movement amount data (CM) for the position and orientation of the camera are determined with the object of detecting the position of the target in every position and detecting the position of the target over a wide range by simply performing calibration once in an optional position. Next, the position of the target is detected from this calibration data (CDB) and from the imaging data (CM) for the target in position B of the camera. This technique involves establishing a correlation between the coordinates of the target and the coordinates of the camera also when the camera is moved once the calibration has been performed. However, the accuracy of this correlation is linked solely with the degree of accuracy of the movement amount data (CM) for the position and orientation of the camera. Therefore, a highly accurate drive mechanism must be provided. This also entails the fundamental defect that errors accumulate with each successive movement.

SUMMARY OF THE INVENTION

A problem that the present invention is intended to solve is to provide a camera calibration method not requiring the work involved in installing and withdrawing a calibration tool as a preliminary process and which, even when the position and orientation of the camera and the focal length thereof are changed, allows capturing image to be performed by accurately calibrating the camera parameters in accordance with the changes in the position and orientation of the camera and the focal length thereof.

Further, a technology for handling the respective camera parameters of a plurality of cameras arranged separately at large intervals is provided.

The calibration tool of the present invention is a transparent camera calibration tool in which a plurality of indicator points is spatially distributed and fixed. The indicator points are formed as a group of intersecting points of thin wires rendered by extending a plurality of parallel thin wire groups to a frame in different directions. The indicator groups are arranged in at least two sets in a non-coplanar relationship. Alternatively, the indicator groups are embodied by distributing distinguishable minute particles in a transparent raw material or by marks or the like in the surface of the raw material. Further, the indicator points may be embodied by means of a combination of a transparent plate on which a fluorescent material is arranged and a light source that irradiates an excitation beam. Further, a composite-type calibration tool, in which a transparent calibration tool comprising a combination of a transparent plate on which fluorescent material is arranged and a light source that irradiates an excitation beam and another such transparent calibration tool are integrated in a state in which relative positions are fixed is proposed.

The camera calibration method of the present invention comprises the steps of installing a transparent camera calibration tool in which a plurality of indicator points is spatially distributed and fixed in a position close to the front of the camera in a stationary state in a world coordinate system and, as a preprocessing to imaging an object, imaging the plurality of indicator points by setting the lens focus at close range and estimating the extrinsic and intrinsic parameters of the camera from the corresponding image.

The camera calibration method of the present invention establishes a plurality of indicator points as marks that are distinguishable by means of a specified color filter and estimates extrinsic and intrinsic parameters of a camera from an image that is rendered by overlaying an observed image and the indicator points. In addition, the camera further comprises a switching filter that is able to transmit or cut a specified color of the marks, wherein the plurality of indicator points is imaged and the extrinsic and intrinsic parameters of the camera are estimated from the image.

Proposed calibration methods in cases where focus adjustment is required in calibration that employs the transparent camera calibration tool of the present invention include an embodiment in which the observed image and image for calibration are obtained by adjusting the focus of one camera, an embodiment in which the observed image is captured by one of the two cameras, whose positional relationship is already known, while the image for calibration is captured by the other camera, and an embodiment in which one multi-focus camera the focus of which is adjusted to a remote object and to a transparent camera calibration tool in which a plurality of indicator points in a close position is spatially distributed and fixed is used and the position and orientation of the camera are analyzed by obtaining the observed image by means of one camera and the image for calibration by means of the other camera. In addition, an embodiment in which a multi-focus camera that has a zoom function is used and the focal length and so forth is analyzed from the image for calibration according to the change in the zoom is also represented.

The camera calibration method according to the present invention proposes an embodiment in which a light beam is irradiated onto a transparent plate and indicators are displayed by means of diffused reflection at the surface of the transparent plate or indicators are displayed by arranging fluorescent material on the transparent plate and making the light beam an excitation beam. Camera parameters are then analyzed from the image for calibration rendered by imaging the indicators.

The stereo camera calibration method according to the present invention involves disposing a transparent camera calibration tool in front of two cameras arranged in different positions in respective positional relationships that are already known in a world coordinate system and then analyzing the parameters of the two cameras from the indicator image of the transparent camera calibration tool.

Further, the stereo camera calibration method according to the present invention involves disposing, in a stationary state in a world coordinate system, a composite calibration tool produced by combining a transparent camera calibration tool in which a plurality of spatially distributed and fixed indicator points is formed by means of a transparent plate on the surface of which a fluorescent material is disposed and a light source that irradiates an excitation beam and another transparent camera calibration tool in front of two cameras arranged in different positions and then analyzing the parameters of the two cameras from a captured image of points at which four or more light beams irradiated by one light source intersect the transparent plate and from an indicator image of the other transparent camera calibration tool.

The camera calibration method of the present invention involves installing a transparent camera calibration tool, in which a plurality of indicator points is spatially distributed and fixed, in a position close to the front of camera in a stationary state in a world coordinate system and capturing an image taken of an object and an image for calibration taken of calibration indicator points to perform camera calibration. Because, when the image for calibration is photographed, appropriate usage of focus and color band is employed, the existence of the calibration tool does not constitute any kind of obstacle to the image and therefore need not be withdrawn. Even when the position or orientation of the camera or the focal length thereof is changed, the image for calibration can be obtained simply each time such a change occurs and the extrinsic and intrinsic parameters of the camera can be calibrated accurately from a newly captured image for calibration. Accordingly, even in the case of a moving object, image measurement can be performed while performing image capture and calibration alternately while allowing the camera to track or enlarge the object.

Further, even when the calibration pattern is remained, this is not considered a problem in terms of the position of the calibration pattern and purpose of usage, and so forth. In a case of this kind, $60^{th}$ an observed image and image for calibration are not captured. Instead, calibration can be finished by means of one photograph.

The possibility of a calibration method that uses a conventional calibration tool being beneficial to stereo vision and image mosaicing technologies, and so forth, whose time-consuming application in calibration is complicated, increases.

Further, when a composite calibration tool that integrates a transparent calibration tool, which comprises a combination of a transparent plate on which a fluorescent material is disposed and a light source that irradiates an excitation beam, and another such transparent calibration tool in a state in which relative positions are fixed is used and the points at which four or more light beams irradiated by one light source intersect a plate tool are established as indicators, the relative position and orientation of the two sides of the plate can be detected even when the distance between the stereo cameras is large. Therefore, a stereo vision of a remote object can be implemented sensitively. Further, the placement of a transparent plate on which a fluorescent material is disposed in front of a plurality of cameras arranged in different positions, the combination and arrangement, for any plate tool, of four or more excitation light beams irradiated by one light source so that the light beams intersect at least one other plate tool, and the analysis of the camera parameters from the captured image of the intersecting points and the indicator image of the other transparent camera calibration tool make it possible to grasp a plurality of camera position/orientation relationships and, therefore, implement highly accurately a multi-view stereo vision of a large space such as a baseball ground, soccer pitch, airport, or the like can be implemented highly accurately.

The calibration method of the present invention is capable of grasping changes in camera position and orientation resulting from age-related degradation caused by vibration and so forth and may therefore be associated with an increase in reliability. Further, in a conventional calibration method, because the calibration tool is removed following calibration, it is difficult to specify the orientation and position of the origin in a world coordinate system, which is an obstacle to a practical application. However, the technique of the present invention affords the benefit of being able to specify clearly a world coordinate system represented by the transparent camera calibration tool. The technique of the present invention can also easily adapt to the calibration of camera parameters that accompanies changes in the zoom, which has been a burden conventionally, in the case of a camera equipped with a zoom mechanism.

The calibration tool of the present invention is a transparent camera calibration tool that is rendered by arranging indicator groups in at least two sets in a non-coplanar relationship, the indicator groups being rendered by forming intersecting points of thin wires extended to a frame as a group of intersecting points of thin wires rendered by extending a plurality of parallel thin wire groups in different directions and by spatially distributing and fixing a plurality of indicator points that are embodied by forming distinguishable minute particles in a transparent raw material, and so forth. Therefore, even when the calibration tool is disposed directly in front of the camera, the presence of the calibration tool represents no obstacle whatsoever when the object is imaged, and the position of the indicator points can be distinguished on the image.

So too in the case of a transparent camera calibration tool in which a plurality of indicator points are embodied by means of a combination of a transparent plate, which is rendered by arranging a distinguishable color filter and fluorescent material in a transparent raw material, and a light source that irradiates an excitation beam, the transparent camera calibration tool is able to operate without being an obstacle at the time of photography of an object even when the calibration tool is placed at close range, which causes focal blur.

By virtue of its compact structure, the calibration tool according to the present invention is also easily carried around with a camera and is easy to install, meaning that applications to camera systems in a variety of forms and additional applications for existing camera systems can be expected.

BRIEF DESCRIPTION OF THE DRAWINGS

FIG. 1 shows an example of the transparent camera calibration tool of the present invention in which a group of intersecting points of wires extending to a frame are the indicator points;

FIG. 2 shows an example of the transparent camera calibration tool of the present invention in which a calibration pattern is added to a transparent material as an indicator;

FIG. 8 shows a first embodiment of the transparent camera calibration tool of the present invention;

FIG. 9 illustrates a first embodiment of the calibration method of the present invention that uses the transparent camera calibration tool and one camera;

FIG. 12 illustrates the analysis of camera parameters that vary according to changes in the zoom by means of the calibration method of the present invention that uses the multi-focus camera of FIG. 11;

FIG. 13 is a scene image in which the transparent camera calibration tool and an object are placed in order to perform imaging by means of two cameras that are fixed side by side on a stage with 6 degrees of freedom;

FIG. 14 is an example of imaging of an image for calibration and an observed image that are captured in the scene of FIG. 13;

FIG. 16 illustrates a comparison between images that are obtained by selecting the RGB signal of the camera in an embodiment example that uses the calibration tool rendered by adding indicators to a transparent plate by means of a color filter;

FIG. 17 illustrates an embodiment example of a stereo camera calibration tool that is installed in an airport as well as the calibration method thereof;

DESCRIPTION OF THE PREFERRED EMBODIMENTS

Figure 3:
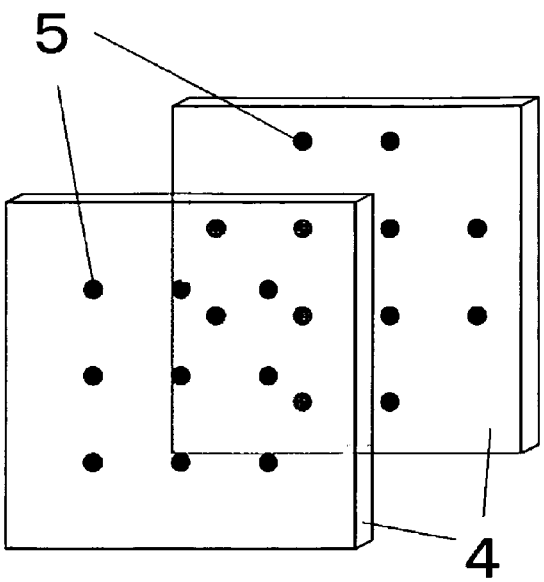
FIG. 3 shows an example of the transparent camera calibration tool of the present invention in which a color filter indicator is added to a transparent material.

The essence of the problem with conventional camera calibration may be attributed to the calibration tool. If the calibration tool were always able to be projected within an image, the problems would be solved. However, this is not realistic due to the labor involved in installation and the problems of interference with an observed image. The basic concept of the present invention is to provide a calibration tool that is able to be projected at any time and without interfering with an observed image and to propose a method of using the calibration tool.

The present invention attempts to solve this problem by proposing a transparent camera calibration tool. The transparent camera calibration tool of this specification signifies a tool that is capable of imaging, by means of the camera, an object that lies opposite the camera even when a calibration tool is interposed between the camera and the object. The present invention utilizes the characteristics of a transparent camera calibration tool and is employed installed directly in front of the camera. General cameras are confronted by the problem of focus adjustment. When focusing does not take place, blurring occurs instead of an image of the target being formed in the imaging area. The transparent camera calibration tool of the present invention uses the characteristics of the camera and, when focusing is implemented at close range, the transparent camera calibration tool, which is installed directly in front of the camera, is able to take clear shapes. On the other hand, when the tool focuses on an object that is a remote target, the object image can be taken after being transmitted by the transparent camera calibration tool. Here, the calibration tool does not form an image in the imaging area due to the effects of optical blur and the image quality is barely affected. Therefore, the transparent camera calibration tool is advantageous in that same need not be withdrawn each time an observed image is captured and allows an image to be taken without moving the transparent camera calibration tool. Further, even when the position and orientation of the camera is changed, as long as an image rendered by focusing on the transparent camera calibration tool is acquired, a response to the amount of variation between the world coordinate system and the camera coordinate system can be implemented by analyzing the image.

Further, Japanese Patent Application Laid Open No. H8-43026 'Calibration device and program', published on Feb. 16, 1996) discloses a calibration device for which a color system is extended in the form of a lattice and in three dimensions. This is structurally similar to the 'tool with a constitution in which indicator points are formed as a group of intersecting points of thin wires rendered by extending a plurality of parallel thin wire groups in different directions and the indicator groups are arranged in at least two sets in a noncoplanar relationship' of the present invention. However, because wire groups in optical directions are distinguished according to color, the color-coding requirement differs from the directional change requirement of the present invention. The technological significance of 'extending thin wire groups in different directions' of the present invention greatly differs not only with regard to the judgment with respect to the position in the axial direction but also in that the angle that is formed with the other groups on the image is taken as correction information. Further, Japanese Patent Application Laid Open No. H8-43026 makes absolutely no suggestion of a technological ideal that involves imaging a photographic-object image and the calibrated image by changing the focus so that the co-existence of these images is not a hindrance to the other image.

In an object-tracking process that is performed in a state where the camera settings, such as a zoom operation or the like, are not changed, only the position and orientation (extrinsic parameters) of the camera change, while the intrinsic parameters, which are qualities specific to the camera may be regarded as unchanging. Accordingly, the intrinsic parameters can be used when same are calibrated and recorded by means of a conventional method beforehand. When an object-tracking process or other process is performed, conversion of the coordinate system and image measurement and analysis by using intrinsic parameters that have been calibrated beforehand and extrinsic parameters that are sequentially measured by means of the present invention are effective.

Further, strict focus adjustment is accompanied by a phenomenon whereby the optical center (lens center, origin of camera coordinates) position changes minutely. However, this problem can be solved by considering the variation amount of same if same is measured beforehand and stored.

In addition, the present invention proposes a transparent camera calibration tool that utilizes a bandpass filter and performs simultaneous capture of an observed image and image for calibration through appropriate band usage in order to solve the problem of the withdrawal and installation of the calibration tool. A band that allows transmission without attenuation and a shielded band exist because of the bandpass filter. By coating a substance with a bandpass effect as a calibration pattern on a transparent raw material, the shielded band serves as a calibrated image and the image of the transmission band can be used as the image.

This method can be applied to a normal color camera by using a color filter constituting a visible-range bandpass filter. However, in this case, because the color band used as the shielding band is the calibrated image, the observed image is not in full color. However, because computer vision is mostly performed based on an image of a single band, the obstacle is small even when the observed image is not in full color.

Simultaneous capture of an image for calibration and an observed image is proposed as a method for solving the problem of the withdrawal and installation of the calibration tool. In order to prevent interference caused by the capture of the calibration pattern of the observed image, appropriate usage of focus and capturing band is employed and respective transparent camera calibration tools and usage methods thereof are proposed. Further, these methods can also be used effectively in combination depending on the conditions.

The present invention is based on calibration of camera parameters for the three-dimensional positions of spaces in a calibration pattern that is projected in the image for calibration and two-dimensional positions on the surface of the image. A straightforward explanation of an algorithm for calculating camera parameters is provided here.

Figure 18:
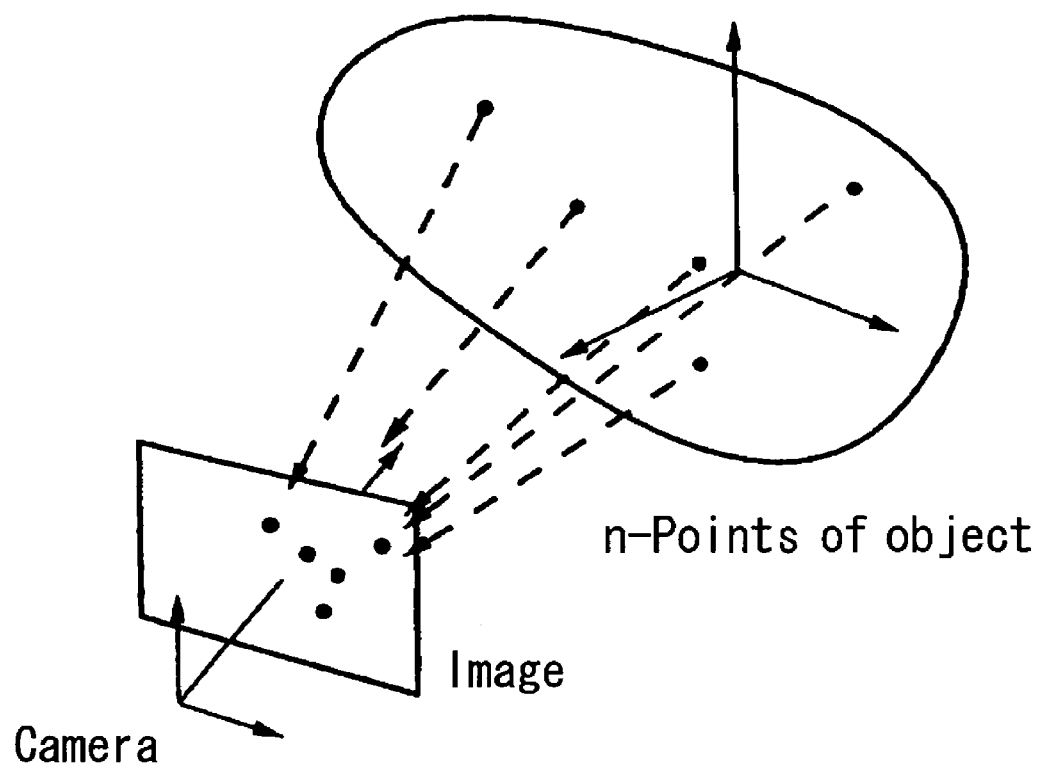
FIG. 18 is a PnP problem diagram showing world coordinates and camera coordinates in camera calibration.
Figure 19:
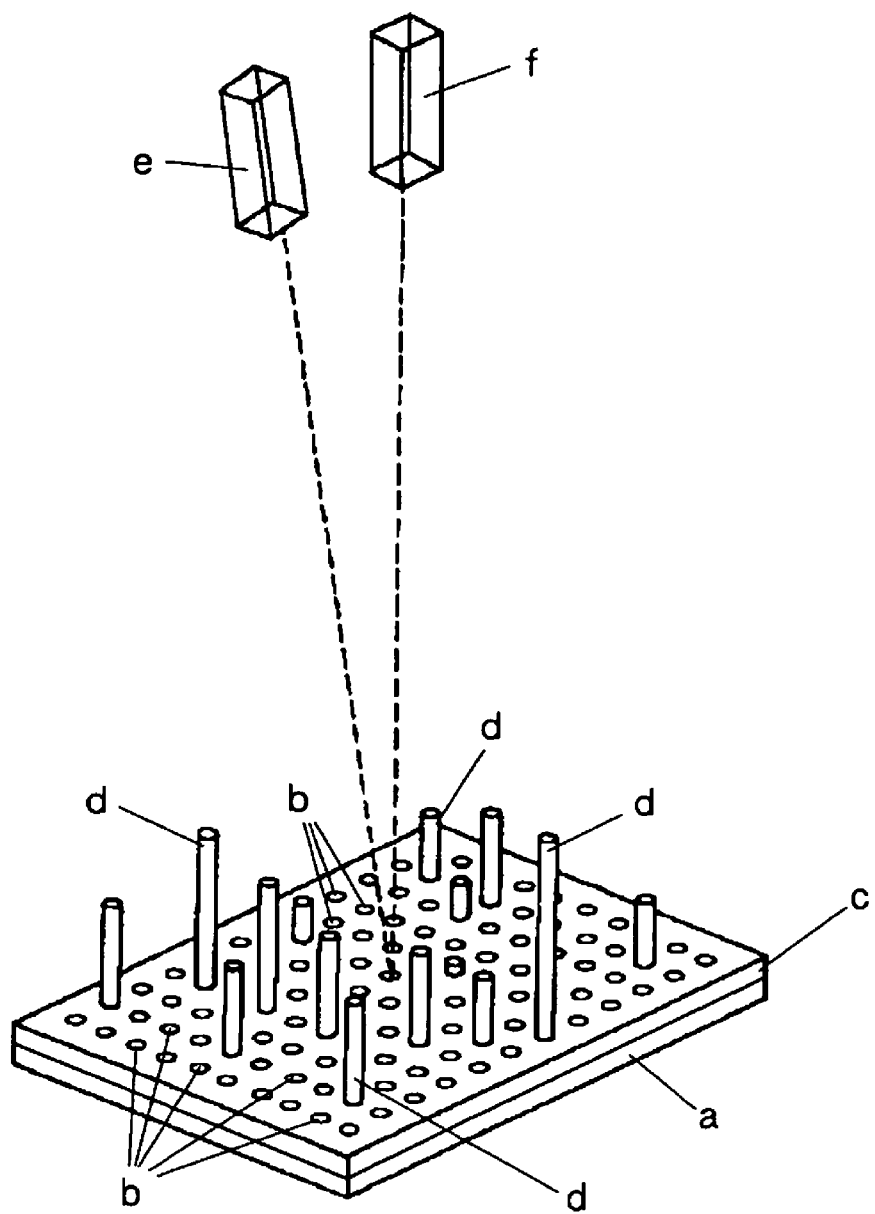
FIG. 19 shows an example of a conventional calibration tool.
Figure 20:
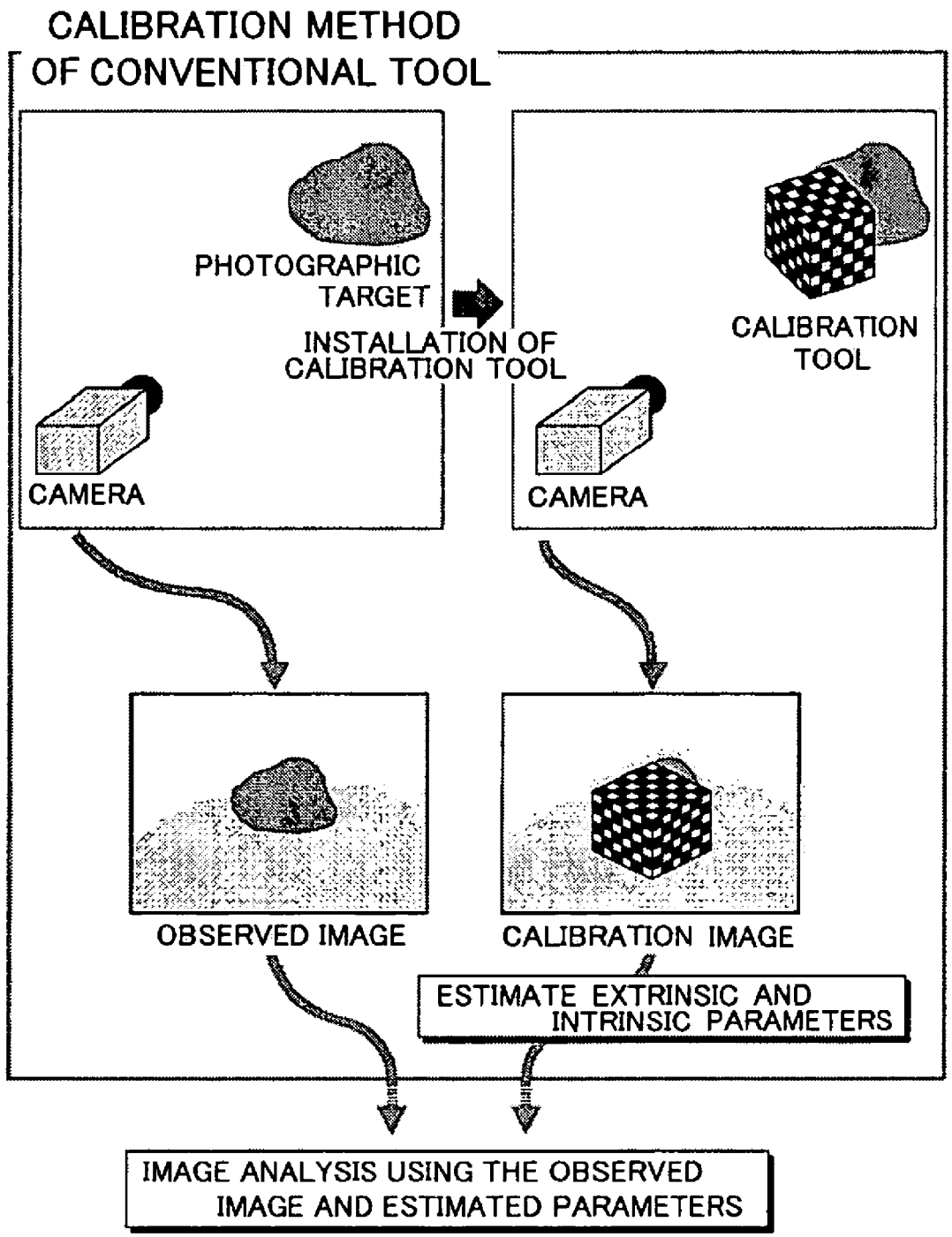
FIG. 20 illustrates a calibration method that is implemented by using a conventional calibration tool.

A total of eleven parameters are found by means of this calibration, namely, six extrinsic parameters that express the position and orientation of the camera and five intrinsic parameters that express qualities specific to the camera. The six extrinsic parameters that express the position and orientation of the camera are expressed by means of a relative relationship between the world coordinates and camera coordinates and can be expressed by means of a rotation matrix and translation vectors. The problem of determining six extrinsic parameters from an image that is rendered by using a camera to image a plurality of n points, for which information on the position in world coordinates is known, is known as the PnP (perspective n-point) problem and is well-known. This aspect is shown in FIG. 18. The calibration step has two stages, which include a step of estimating a projection matrix P that establishes a projection between three-dimensional points $[X, Y, Z, 1]^T$ based on world coordinates and a two-dimensional source image $[u, v, 1]^T$ based on camera coordinates for these points and a step of determining an intrinsic parameters A and extrinsic parameters R and t from this projection matrix.

A projection equation for a perspective projection is expressed by means of the following formulae:

$$\tilde{m} \cong P\overline{M} = A[R\ t]\overline{M} \quad (1)$$

$$\tilde{m} = [u, v, 1]^T, \overline{M} = [X, Y, Z, 1]^T$$

$$\text{Projection matrix } P = \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix} = \begin{bmatrix} P_1^T & p_{14} \\ P_2^T & p_{24} \\ P_3^T & p_{34} \end{bmatrix}$$

This projection matrix P is a 3×4 matrix with twelve elements. Two linear equations (2) relating to element P can be established from one item of three-dimensional point information and two-dimensional image information thereof.

$$P_1^T M_i - u_i P_3^T M_i + p_{14} - u_i p_{34} = 0$$

$$P_2^T M_i - v_i P_3^T M_i + p_{24} - v_i p_{34} = 0 \quad (2)$$

Projection matrix P is found by using n points.

Thereafter, an intrinsic parameters A, an extrinsic parameters R representing the orientation, and an extrinsic parameter t representing the position are found by using the projection matrix P.

$$A = \begin{bmatrix} \alpha_u & -\alpha_u \cot\theta & u_0 \\ 0 & \alpha_v/\sin\theta & v_0 \\ 0 & 0 & 1 \end{bmatrix}, R = \begin{bmatrix} r_1^T \\ r_2^T \\ r_3^T \end{bmatrix}, t = \begin{bmatrix} t_x \\ t_y \\ t_z \end{bmatrix} \quad (3)$$

Further, if the number of points required to specify P is six or more and the number n is large, a visible increase in the accuracy for the least square can be expected. However, the condition that all the points should be in one plane is removed.

The lens distortion coefficients can be estimated highly accurately by means of a nonlinear calculation once the extrinsic and intrinsic parameters have been found as detailed above.

The transparent camera calibration tool of the present invention will be described next. However, in order to image a remote object image by transmitting same through this calibration tool, the structure of the calibration tool basically requires that six or more indicator points be arranged in a three-dimensional distribution so that not all the points are in one plane in a space for which a transparent form is adopted. Further, this plurality of indicator points must be arranged over an area that is imaged in the same focus state as a blur-free image. Therefore, basically, a spatially extended netlike body, particles mixed in a transparent material and marks coated on a transparent raw material, and so forth, may be considered.

The structure shown in FIG. 1A is produced by extending thin wires 2 to a frame 1 with a predetermined thickness in different directions so that same intersect each other and then distributing intersecting point groups 3 of two sets of indicator points at the front and rear sides of frame 1. This represents a simple structure for which optical actions such as refraction need not be considered because there are spaces in the frame in which transparent material is not used. Creation of such a structure is straightforward and hence even large structures may be created easily. In this embodiment example, seven wires 2 extend at parallel and equal intervals at the front of the square frame 1 and seven wires 2 extend at parallel and equal intervals, lying orthogonal to the other seven wires, meaning that 7×7=49 intersecting point groups 3 are the indicator points. At the rear side of frame 1, ten each of wires 2 extend at parallel and equal intervals, lying orthogonal to each other in diagonal directions and, therefore, of these intersecting point groups, 10×10=100 intersecting point groups are the indicator points 3. As per the calibration device of Japanese Patent Application Laid Open No. H8-43026 'Calibration device and program', two sets of indicator groups can be easily identified by varying the color of the wires and so forth. Thus, the extension of a plurality of wires at parallel and equal intervals so that these wires are orthogonal to each other is for the sake of convenience in the analysis processing. However, the required constitution may be one in which six or more indicator points are formed as intersecting points of thin wires 3 that extend to the frame 1 and arranged so that not all of the indicator points are in one plane.

The structure shown in FIG. 1B is a stereo vision transparent calibration tool that allows calibration of the relative positional relationship of two cameras and rectification of the stereo images, and so forth, to be performed. This structure has substantially the same constitution as that of the previous example, that is, this is a structure in which thin wires 2 are extended to a rectangular frame 1 with a predetermined thickness in different directions to intersect one another and intersecting point groups 3, which are two sets of indicator points, are distributed in correspondence with the interval between two sets of cameras side by side at the front and rear sides of the frame 1. Calibration of each camera of a stereo vision system in which two cameras are laterally arranged can be implemented in a straightforward manner. Creation is simple and the extension of a plurality of wires so that same are orthogonal at parallel and equal intervals for the sake of convenience in the analysis processing is as per the earlier example.

The structure in FIG. 2A is an example in which a calibration pattern is formed on the upper and rear sides of a transparent material 4 such as glass, acrylic, or the like. This structure can be fabricated easily and accurately by means of a method in which a transparent sheet, on which a plurality of indicator points are the print marks 5, is attached, or the like. Varying the color so that the indicator points on the upper and rear sides are readily distinguished, or similar, is effective.

The structure shown in FIG. 2B is a transparent camera calibration tool used to fabricate a panoramic view. A tool for obtaining parameters for the position and orientation of a camera when creating a panoramic view while panning and tilting the camera may be considered. This is an example in which a glass or acrylic transparent material 4 is formed in a state of equal thickness in a hemisphere so that the lens effect does not occur irrespective of the direction of the optical axis and a calibration pattern 5 is formed on the upper and rear sides. This structure can be fabricated easily and accurately by means of a method such as a method that involves marking the surface of the raw material directly or attaching a transparent sheet on which a plurality of indicator points is printed. There is also a method that forms indicator groups by admixing and distributing minute particles 5 in a liquid transparent raw material and then curing same.

The above description described an embodiment in which the target exists in a remote location relative to the camera, the calibration indicators are at close range, and observed images can be captured by changing the focal length. However, a method of selecting and acquiring an observed image rendered by imaging a photographic image and an image for calibration in which indicators are perceivable that are not subject to focal blur will now be described hereinbelow. This method employs a color-filter transparent camera calibration tool and involves placement of two indicators by means of a specified color filter 5 in transparent material 4 as shown in FIG. 3 with a slight distance between a moving camera and the target. If normal imaging is performed, a target and an image in which indicators are perceivable are obtained. However, if imaging takes place via a filter that cuts the indicator color, the observed image is obtained without projecting the indicators and, if imaging is executed via a bandpass filter that transmits only the indicator color, the indicators can be imaged clearly. The analysis of the camera parameters from an image for calibration in which the indicators are projected is the same as that described earlier.

Figure 4:
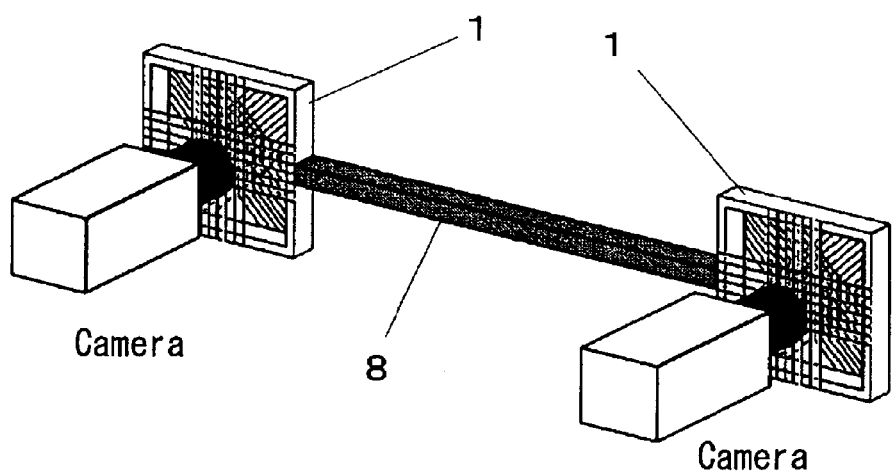
FIG. 4 illustrates an example of the transparent camera calibration tool of the present invention that is used in a stereo camera system.
Figure 5:
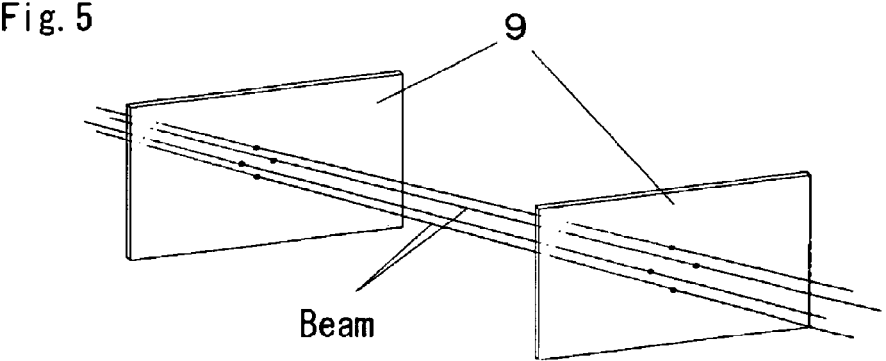
FIG. 5 illustrates an example of the transparent camera calibration tool of the present invention in which the intersecting points of two transparent plates and a plurality of light beams serve as indicators.

Next, in a case where calibration of a stereo images are performed by using a calibration tool such as that shown in FIG. 1B, the distance between two cameras is limited. Because prior knowledge of the distance between regions in which indicators are arranged is a prerequisite, in an embodiment that links, by means of a connecting rod 8 or the like, the respective frames 1 of the two calibration tools in which indicators are disposed as shown in FIG. 4, the respective heights are limited to ten meters and, therefore, it is not easy to carry around or move the structure. Therefore, as a method of adapting to the requirements of stereo imaging of a remote object, a method has been proposed that involves providing an adequate distance between the two cameras and rendering a calibration tool from two transparent plates 9 and a light beam that penetrates the two transparent plates 9 as shown in FIG. 5 that makes it possible to sequentially acquire information on the position and orientation of each camera. It is appropriate to use a laser as the light beam since same is directional, can be focused and has a beam strength that is not prone to attenuation. If the beam is irradiated by a light source, slight diffused reflection arises at the surface of the transparent plates 9 when the beam penetrates same, meaning that the intersecting points can be observed. In order to display the intersecting points more clearly, an embodiment in which a fluorescent color material is coated (or applied by means of another process) on the transparent plates and fluorescent light emission is brought about through excitation using a light beam may be implemented. If a plurality of light beams penetrates the transparent plates 9, the intersecting points can be made to display indicators of this quantity and, if the beam irradiation is stopped, the indicators are eliminated and are not a hindrance to the object image that returns to the transparent plates 9. The distance between the two transparent plates 9 can be detected by installing two transparent plates 9 one at a time between the two cameras and imaging target and then performing indicator imaging and analyzing the two images.

Figure 6:
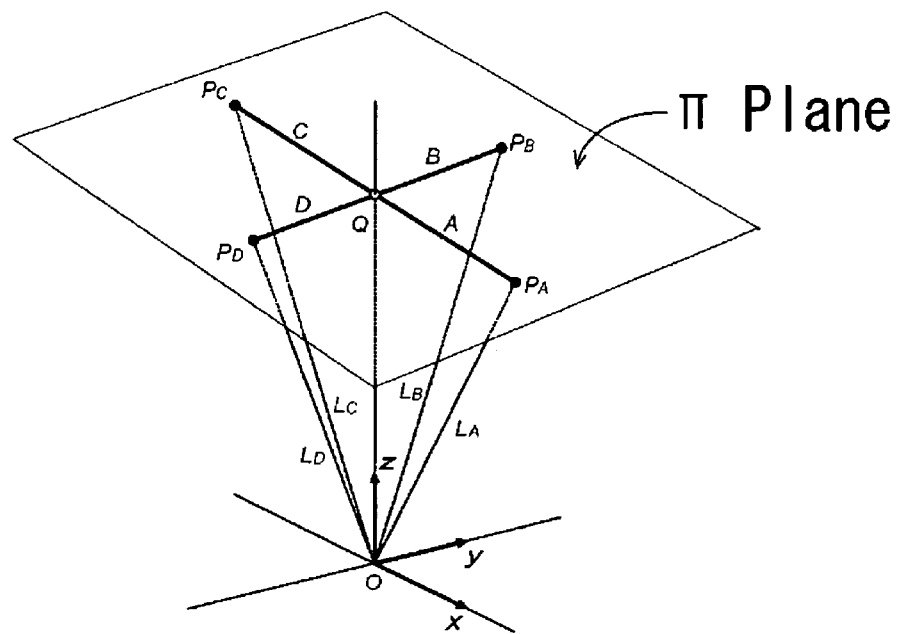
FIG. 6 illustrates an analysis method that derives a plane equation that uses four straight lines and the intersecting points thereof.

As the basis for this analysis method, the relationship between the plane and straight-line intersecting points will now be described with reference to FIG. 6. Plane equations are derived by using two pairs of four straight lines ($L_A$, $L_B$, $L_C$, and $L_D$) that pass through the origin O in planes x-z and y-z and have an equal angle of inclination k about axis z and the points of intersection with plane $\Pi$ ($P_A$, $P_B$, $P_C$, and $P_D$)

When plane $\Pi$ is z=ax+by+c (c>0), the four straight lines have the following equations.

$L_A$: kx=z, y=0   $L_B$: ky=z, x=0

$L_C$: -kx=z, y=0   $L_D$: -ky=z, x=0    (4)

where k>0.

The intersecting point Q of the line part $P_A P_C$ and line part $P_B P_D$ in plane $\Pi$ is the intersecting point of plane $\Pi$ and the z axis. The lengths of $P_A Q$, $P_B Q$, $P_C Q$, and $P_D Q$ are A, B, C and D respectively. The equation (a, b, c) of plane $\Pi$ is found by using A, B, C, D, and k. The coordinates of the intersecting points $P_A$, $P_B$, $P_C$, and $P_D$ are as follows:

$$P_A: \left(\frac{c}{k-a}, 0, \frac{kc}{k-a}\right) \quad P_B: \left(0, \frac{c}{k-b}, \frac{kc}{k-b}\right)$$
$$P_C: \left(\frac{-c}{k+a}, 0, \frac{kc}{k+a}\right) \quad P_D: \left(0, \frac{-c}{k+b}, \frac{kc}{k+b}\right) \quad (5)$$

Further, the coordinates of point Q are (0,0,c).

When the focus is directed toward line parts $P_A Q$ and $P_C Q$ in plane x-z, the following relations are obtained from the 3-square theorem:

$(k-a)^2 A^2 = c^2(1+a^2)$    (6)

$(k+a)^2 C^2 = c^2(1+a^2)$    (7)

Because the right sides of formulae 6 and 7 are equal, the left sides are also equal, so that solving a second-degree equation for a gives:

$$a = \frac{A \mp C}{A \pm C} k \quad (8)$$

Here, two a are obtained. However, based on the positional relationship in plane x-z a can be specified as 1 from the condition that the sum of the x coordinates of the intersecting points $P_A$ and $P_C$ should be negative.

$$\frac{c}{k-a} \cdot \frac{-c}{k+a} < 0 \quad (9)$$

$$a = \frac{A-C}{A+C} k \quad (10)$$

Formula 10 is then substituted into formula 6 to find c. Because c is positive, $$c = \frac{2ACk}{\sqrt{(A+C)^2 + (A-C)^2 k^2}} \quad (11)$$

Similarly, when the focus is directed toward the line parts $P_B Q$ and $P_D Q$ on plane y-z, b is found.

$$b = \frac{B-D}{B+D} k \quad (12)$$

Further, similarly to the case of plane x-z, c is found from k, B and D.

$$c = \frac{2BDk}{\sqrt{(B+D)^2 + (B-D)^2 k^2}} \quad (13)$$

As described earlier, the Equation of plane $\Pi$ can be derived from the size k of the inclinations of the four straight lines and the distances (A, B, C, D) between the intersecting points of the straight lines and the plane.

Further, the plane $\Pi$ in space possesses only projective distortion due to planar projective transformation upon projection on an image plane. Hence, the required distances A, B, C, and D in space cannot be found in the derivation of the plane equation from the points $P_A$, $P_B$, $P_C$, $P_D$ that are projected onto an observable image. However, if a pornography matrix between the plane $\Pi$ in space and the image plane is known, A, B, C, and D can be found. With the projection conversion matrix, the positions of four or more points in plane $\Pi$ (that is, the transparent plate 9) can be found in a straightforward manner by using points that are already known. Further, in cases where the transparent plate 9 and frame 1 are fixed by means of a supporting rod 11 (as per FIG. 17, which will be described subsequently), the homography matrix can be found by using the positional relationships between the transparent plates 9 and the mounting angle and so forth of frame 1.

According to the present invention, four straight lines passing through this one point are created by means of light beams from one light source and a plane penetrating these straight lines is constituted by a transparent plate. If a light beam is irradiated, observation of the intersecting points that can serve as indicators is possible and, if the light beam is halted, the indicators are not displayed and only the transparent plate can be observed. Hence, an embodiment that affords the function of a transparent camera calibration tool can first be implemented by these means alone. In order to apply this to the distance measurement between cameras in a stereo camera system, two transparent plates are arranged fixedly between the cameras and target and, if four light beams that are irradiated at an equal angle by the same light source pass through the two transparent plates, an equation for the planes of the transparent plates is derived by means of the solution described in the previous paragraph from the image information for the intersecting points of the light beams and the transparent plates. As a result, the relative positions and directions of two planes are known.

Figure 7:
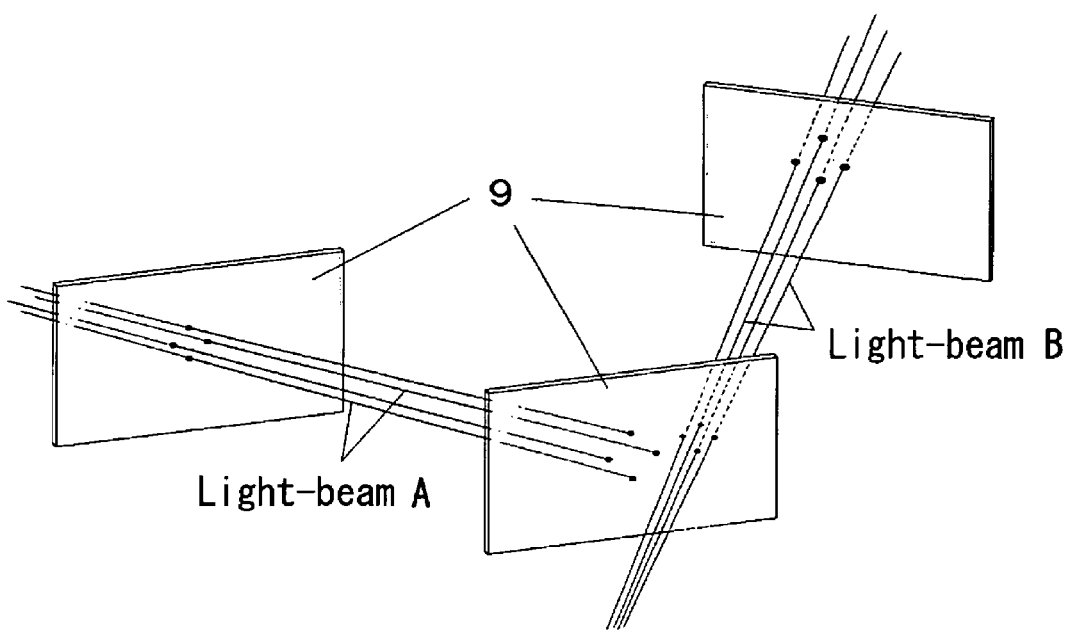
FIG. 7 illustrates a method of analyzing relative position relationships of each plane from the positions of three or more transparent plates and the intersecting points of a plurality of light beams.

Calibration that employs the techniques of the present invention can be implemented by a multi-view stereo camera system that arranges a multiplicity of cameras in a baseball ground, soccer pitch, or the like, in order to change the position in accordance with ball movement. That is, implementation involves placing, in a stationary state in a world coordinate system, the above-mentioned transparent plates 9 in front of the plurality of cameras arranged in different positions as shown in FIG. 7 and arranging any of the transparent plates 9 in combination such that four or more light beams, which are irradiated by one light source, intersect at least one other transparent plate. The transparent plates 9 are constituted such that four or more light beams A irradiated by one light source commonly penetrate the other transparent beam 9 without fail and, therefore, as a result of the solution illustrated in the previous paragraph, the relative position and direction between two planes are known. The one plane has intersecting points with four or more light beams B that are common to yet another plane and therefore the relative positions and directions between these two planes are known. The positions and directions of all the transparent plates can be analyzed in order to specify the positional relationships thereof sequentially. In order to distinguish the intersecting points of the light beam A and light beam B on one transparent plate 9, the wavelengths of the light beams that are employed are desirably different. That is, the light beams are distinguished by means of light beams of different colors or a plurality of fluorescent materials are used to generate fluorescent light of different colors by means of the difference in the wavelength of the excitation light.

Embodiment Example 1

FIG. 8 shows an embodiment example of a stereo vision transparent camera calibration tool. A rectangular frame is created by integrating two aluminum plates with a breadth dimension 29 cm, vertical dimension of 12 cm and a thickness of 0.5 cm so same are overlapped with a distance of 2 cm between the front face and the rear face, whereupon steel wires with a diameter of 0.083 mm are fixed to one side at 3 cm intervals seven at a time by using adhesive so that the steel wires intersect each other vertically and horizontally, while the same wires are fixed to the other side at 3.54 cm intervals eleven at a time by using adhesive so that the wires are diagonally orthogonal.

Embodiment Example 2

Next, an embodiment of a camera calibration system that uses the transparent camera calibration tool of the present invention will be described. The simplest embodiment in terms of equipment is a case where one camera is used. As shown schematically in FIG. 9, in this embodiment, a transparent calibration tool is first installed in a position directly in front of the camera as a processing to capture as shown in the top right of FIG. 9, whereupon a close range transparent calibration tool is imaged by the camera, the image of the calibration tool shown on the center right is obtained, and the image is analyzed, whereby the parameters for the camera position and orientation are calculated and stored. A procedure is adopted in which, a short while afterwards, the camera is made to focus on an object a remote distance therefrom and photographs the object as shown in the top left to obtain an observed image of the object as shown on the center left, whereupon a three-dimensional analysis of the observed image is performed based on the previous camera position and orientation parameters. When the observed image is captured, there is the advantage that, by virtue of the fact that there is no need to withdraw the calibration tool, the work efficiency is considerably higher than that afforded by conventional calibration methods. However, because the analysis of the observed image is performed on the basis of the parameters for the camera position and orientation that are then obtained from the image for calibration as mentioned earlier, the calibration tool must be captured and subjected to calibration work by changing the focus each time the camera position and orientation are changed.

Embodiment Example 3

Figure 10:
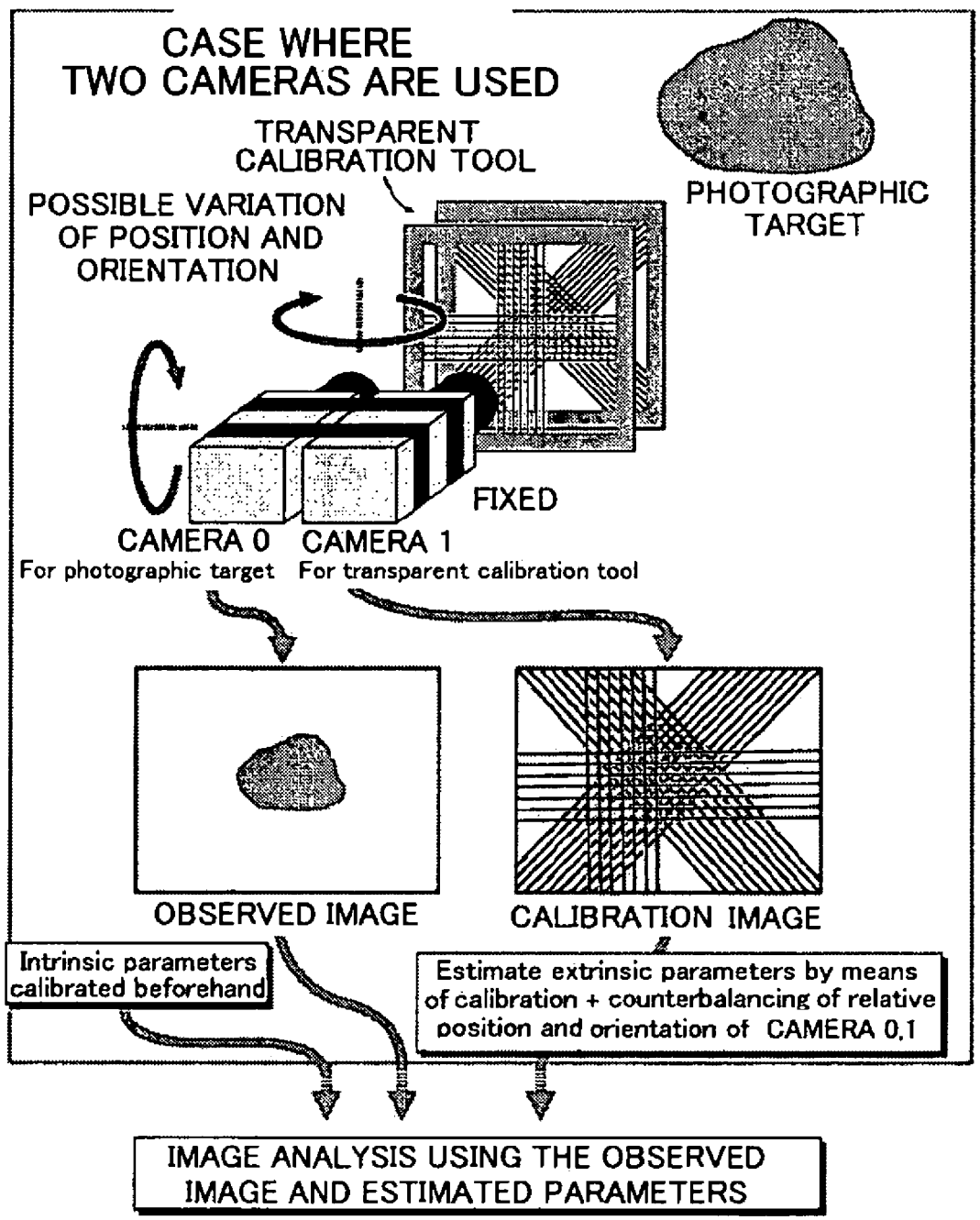
FIG. 10 illustrates another embodiment of the calibration method of the present invention that uses the transparent camera calibration tool and two cameras.

When two cameras are used, appropriate usage that involves allocating one camera especially to image for calibration acquisition and allocating the other camera especially to observed image can be used as shown schematically in FIG. 10. In this case, readjustment of the focus is unnecessary and, therefore, even in the case of scene image in which a moving body is tracked, an observed image such as that illustrated on the center left and an image of the calibration tool such as that illustrated on the center right can be obtained sequentially in parallel by the observed image camera and the image for calibration acquisition camera respectively, whereupon the images can be analyzed and calibration of the time-varying camera positions and orientation can be performed at the same time as the observed image by calculating the parameters of the camera position and orientation. However, in this embodiment, two cameras must be integrally fixed so that same do not move separately as shown at the top and the relative position and orientation relationship between the calibration camera and observation camera must be calibrated beforehand. This entails calculating the position and orientation of the observation camera on the basis of the relative position and orientation relationship between the cameras that is known beforehand from the image of the transparent camera calibration tool that is taken by the calibration camera.

Embodiment Example 4

Figure 11:
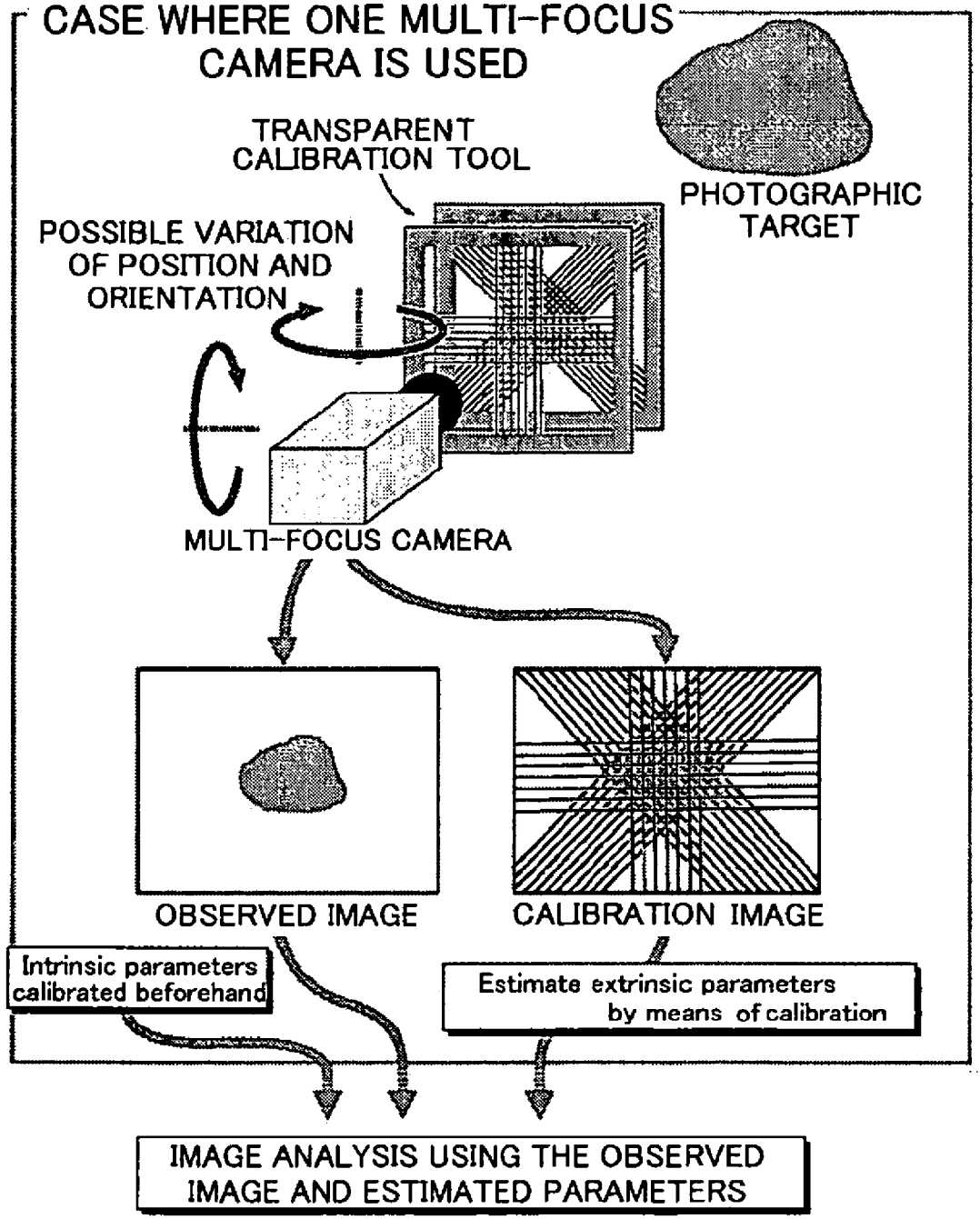
FIG. 11 illustrates yet another embodiment of the calibration method of the present invention that uses the transparent camera calibration tool and one multi-focus camera.

In addition, FIG. 11 shows an embodiment that uses one multi-focus camera the focus of which is adjusted to a remote position and to a close position. This multi-focus camera has an optical system that is divided into two systems within a single camera, on one image plane of which a remote object image is formed and on the other image plane of which a close-position calibration pattern is formed. In this case, the observed image illustrated on the center left and the calibration-tool image illustrated on the center right can be sequentially obtained in parallel. Therefore, by analyzing these images, parameters for the position and orientation of the camera can be calculated and calibration of the time-varying camera position and orientation can be performed at the same time as image of the observed scene as per Embodiment example 3. However, because simultaneous image for calibration and observed image is possible by means of a simple camera, it is not necessary to know the relative position and orientation relationship between cameras in cases where two cameras are used. Even when tracking image is performed on an abruptly moving object, this embodiment is able to provide a real-time response with a small processing load.

In computer vision, although it is effective to use a camera with a zoom function to perform imaging by zooming, when the zoom is adjusted, there is then the burden of calibrating the camera parameters. As shown in FIG. 12, if the zoom camera is one multi-focus camera the focus of which is adjusted to the above-mentioned remote object and to a transparent camera calibration tool in a close position having a plurality of indicators that is spatially distributed and fixed, images for calibration are obtained simultaneously in parallel even when zoom adjustment is performed. Therefore, camera parameters can be analyzed sequentially.

Thereafter, an example of imaging an image for calibration and an observed image that is performed by using the transparent camera calibration tool according to the present invention shown in Embodiment Example 1 will be illustrated. As shown in FIG. 13A, the transparent camera calibration tool of Embodiment Example 1 is fixed at an angle and installed 20 cm in front of two cameras (SONY DFW-SX900: trade name) that are fixed side by side on a stage with six degrees of freedom, that is, drive in the x, y and z directions and respective drive-rotation mechanisms thereof. Further, an object (a conventional calibration device here) is placed and captured at a distance of 1.5 meters from the front of the cameras as shown in FIG. 13B. It can be confirmed that, while the image in FIG. 14-A is that of a clearly imaged object that the left-hand camera focuses on at approximately 1.5 meters, the transparent camera calibration tool is not completely reflected in the image. The image rendered by focusing the left-hand camera on the transparent camera calibration tool is the image in FIG. 14-B. It can be confirmed that, while the object is reflected in a blurred state, the wires of the transparent camera calibration tool are clearly reflected in the image. The calibration state of Embodiment Example 2 can be implemented from two captured images by switching the focus of one camera. Further, an image that is imaged by focusing the right-hand camera on the transparent camera calibration tool is shown in FIG. 14-C. The fact that, while the object is reflected in a blurred state, the wires of the transparent camera calibration tool are clearly reflected in the image is as per FIG. 14-B, but it can be confirmed that the position of the object and the perceived viewing angle is different. The form of calibration of Embodiment Example 3 can be implemented by combining this image with FIG. 14-A.

Embodiment Example 5

Figure 15:
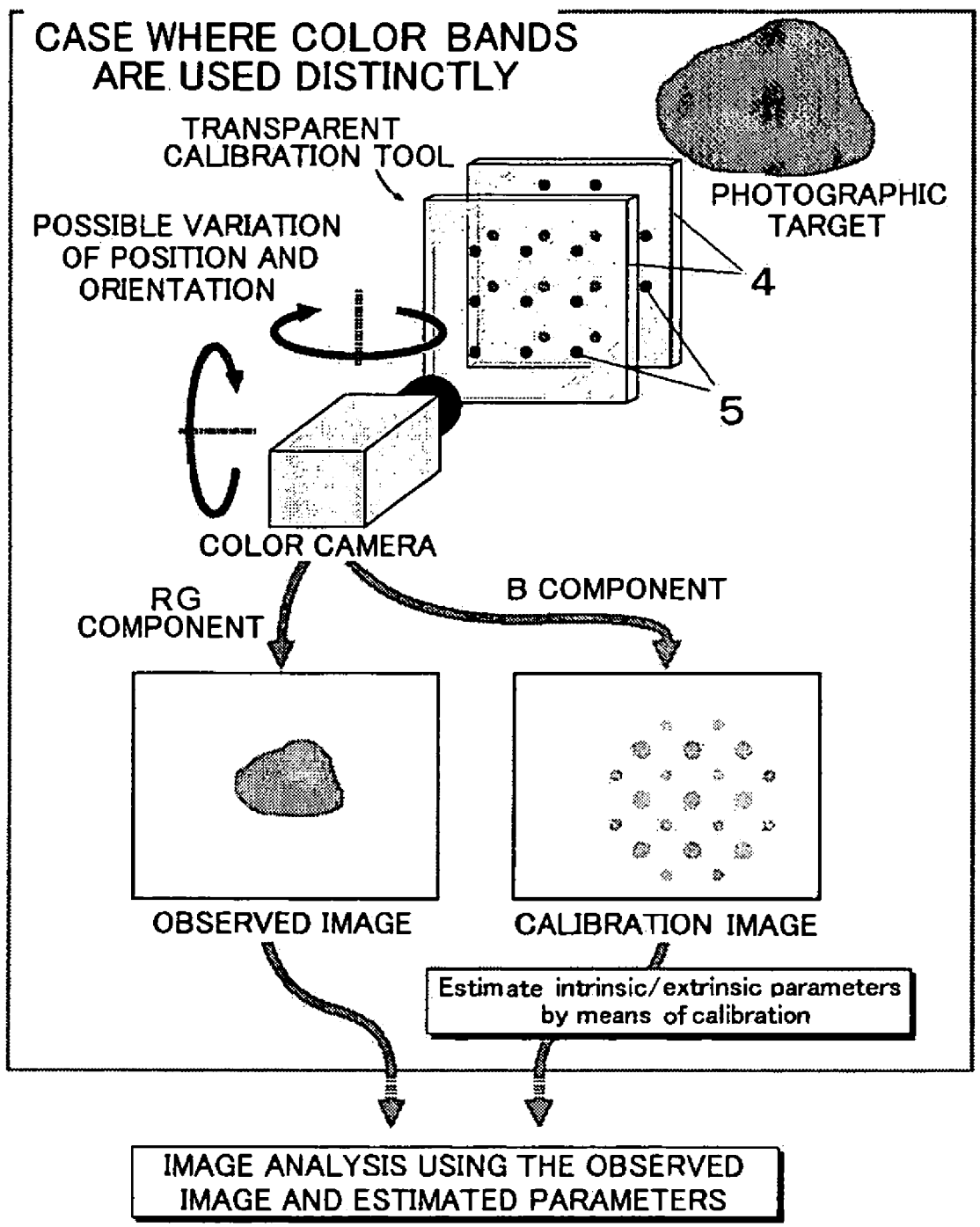
FIG. 15 illustrates an embodiment example of a calibration tool that is rendered by adding indicators to a transparent plate by means of a color filter as well as the calibration method thereof.

A calibration method that is performed by using a color-filter-type transparent camera calibration tool such as that shown in FIG. 3 will now be described with reference to FIG. 15. A color film with a bandpass function is stuck to the surface of a transparent acrylic plate to produce a color-filter-type transparent camera calibration tool. A color camera is prepared and installed facing toward the target and two of the above transparent camera calibration tools are installed between the target and the camera in a substantially intermediate position rather than a short distance from the camera with a slight distance between the transparent camera calibration tools. When color imaging is normally performed in this state, the camera captures the target via the transparent camera calibration tools in a position not causing focal blur. Therefore, imaging takes place with the image and indicators on top of one another as shown in FIG. 16A. When an image rendered by extracting only the B(blue) component of the RGB 3 system of the color camera from the image is obtained, an image in which the indicators are clearly projected is obtained as shown in FIG. 16B. When an image rendered by extracting only the RG (red and green) components is obtained, an image from which the indicators are removed is obtained as shown in FIG. 16C. If there is absolutely no blue component in the object and there are absolutely no components other than the blue component in the indicators, it is expected that only the indicators will be imaged and not the object image in the image of FIG. 16B and that only an image of the object and not the indicators will be projected in the image in FIG. 16C. However, in this embodiment, the indicators are projected strongly in the case of the image in FIG. 16B but are pale in the case of the image in FIG. 16C and the image of the object is projected in both images. This is because the blue filter used uses an automobile light-shielding film and it is estimated that an image that is further enhanced is obtained if the same constitution as that of a gelatin color filter used for optical experimentation is adopted by dissolving an organic dye that functions as a color filter in gelatin raw material, coating a transparent substrate with this organic-dye-containing gelatin and then drying same. However, for the measurement image, the object image and indicators are overlaid in image A, which is a normal color photograph. Therefore, in cases where the indicators are not a particular obstacle, the combined usage of an image for calibration and observed image can also be made.

Further, the calibrated pattern in FIG. 16, is circular but a variety of calibrated patterns may be used to suit the application and so forth, such as a square calibration pattern, or a calibration pattern with small points, or intersections between groups of straight wires.

Embodiment Example 6

Finally, an embodiment example of a stereo camera system calibration method that employs a transparent camera calibration tool, which is constituted by two transparent plates and four laser beams that penetrate the transparent plates shown in FIG. 5 and can be used at an airport, baseball ground, soccer pitch, and so forth, will be described with reference to FIG. 17. Transparent plates the upper surface of which is coated with a fluorescent coating material, a laser light source with a wavelength that is suited to the excitation of the fluorescent material and a diffraction grating are prepared. As shown in FIG. 17, one side of a transparent camera calibration tool, on which the indicator points shown in FIG. 1 are formed as groups of intersecting points of thin wires that are rendered by extending a plurality of parallel thin wire groups in different directions to the front and rear sides of a rectangular frame 1, and one side of the rectangular transparent plates 9 are made to contact one another, mutually opposing sides are linked by means of the supporting rod 11 and integrally constructed at a predetermined angle θ. This combination is not restricted to the constitution above for which it is a required condition that the relative positional relationship between the frame 1, which is formed as a group of intersecting points of thin wires, and the transparent plates 9 should be fixed. Further, the light from the laser light source 10 creates four light beams that are irradiated at an equal angle from the same origin by means of the diffraction grating. The assembled calibration tool is disposed so that the frame 1, which is formed as a group of intersecting points of thin wires in front of the respective cameras, is at close range and the position of the light source is determined so that penetration of the transparent plates 9 of the two assembled calibration tools takes place from the relationship between the angles formed by the four light beams from the laser light source.

An airport stereo vision is assumed in this example and, therefore, although the distance to the target is great and the distance between two cameras must be around several tens of meters, two assembled calibration tools are not linked. Therefore, the distance between the two assembled calibration tools and the orientation thereof are an unknown quantity. Accordingly, by using a camera to observe the points at which the four light beams and the transparent plates 9 intersect and the positions at which fluorescent light is emitted, the relative positional relationships between the two transparent plates is determined by means of the above-mentioned solution. As a result, the distance between the two assembled calibration tools, which are separate structures, and the orientation thereof can be shown in a world coordinate system. Thereafter, calibration can be executed by means of the stereo vision calibration method illustrated in Embodiment Example 1. If it is felt that the display of indicators on the image is bothersome, the fluorescent-light-emitting indicators on the transparent plates need not ordinarily emit light but can instead be made to emit light by irradiating an excitation beam intermittently in accordance with the camera movement.

The present inventors hit upon the idea of the present invention in the process of conducting research into computer vision. However, the invention involves analysis on the basis of images (two-dimensional images), restores three-dimensional information (world coordinate information), for example, composes a natural large image from a plurality of images with different conditions and perceives a moving body such as an automobile as continuous images, for example. The invention therefore represents a technology for which a wide range of applications may be found in technologies that support a robot vision function, and so forth.

What is claimed is:

1. A transparent camera calibration tool, said transparent camera calibration tool comprising:
    a frame having a front face and a rear face, said front face and said rear face are separated by a predetermined distance, and
    indicator points formed, as a group of intersecting points of thin wires rendered by extending a plurality of parallel thin wire groups in different axial directions, on said front face and said rear face of said frame,
    wherein at least the two sets of indicator points at the front and rear face of said frame are arranged in a non-coplanar relationship separated by said predetermined distance and having different angular orientation with respect to each other.

2. A camera calibration method comprising the steps of:
    installing the transparent camera calibration tool of claim 1 in a position close to the front of a camera in a stationary state in a world coordinate system; and, during preprocessing of and following imaging of an object,
    setting the lens focus at short range, imaging the plurality of indicator points, and estimating the camera parameters from an image of the indicator points.

3. A stereo camera calibration method, comprising the steps of:
    disposing the transparent calibration tool according to claim 1 in front of two cameras arranged in different positions, in already-known positional relationships in a world coordinate system; and
    estimating parameters of the two cameras from an image of the indicators of the transparent calibration tool.

4. A transparent camera calibration tool, said transparent camera calibration tool comprising:
    a transparent raw material for capturing an observed image by a transmission band and image for calibration by a shielded band respectively, and
    a plurality of indicator points are distributed in the three-dimensional space and fixed by arranging distinguishable marks in said transparent raw material,
    wherein the distinguishable marks employ a specified color filter.

5. A camera calibration method, comprising the steps of:
    installing the transparent calibration tool according to claim 4 in front of a camera in a stationary state in a world coordinate system;
    overlaying an observed image and a plurality of indicator points; and
    estimating camera parameters from an image of the indicator points.

6. A camera calibration method, comprising the steps of:
    installing the transparent calibration tool according to claim 4 in front of a camera in a stationary state in a world coordinate system;
    providing the camera with a switching filter that is able to transmit or cut a specified color of marks; and, as preprocessing to imaging of an object,
    establishing transmission of a specified color, imaging the plurality of indicator points, and estimating camera parameters from an image of the indicator points.

7. A stereo camera calibration method, comprising the steps of:
    disposing the transparent camera calibration tool according to claim 4 in front of two cameras arranged in different positions, in already-known positional relationships in a world coordinate system; and
    estimating parameters of the two cameras from an image of the indicators of the transparent camera calibration tool.

8. A transparent camera calibration tool, said transparent camera calibration tool comprising:
    at least two pieces of transparent plates of which fluorescent material is disposed on the surface and a light source that irradiates excitation beams,
    wherein directions of the beams from said source of light are a direction unlike the optical axis of the camera which is calibrated, and
    wherein a plurality of indicator points that are the point where said beams intersect with said transparent plates, is spatially distributed and fixed.

9. A composite camera calibration tool rendered by combining, in a state where relative positions are fixed, the transparent calibration tool,
    wherein a plurality of indicator points is spatially distributed and fixed by arranging distinguishable minute particles in a transparent raw material and the transparent camera calibration tool according to claim 8.

10. A composite camera calibration tool rendered by combining, in a state where relative positions are fixed, the transparent calibration tool,
   wherein a plurality of indicator points is spatially distributed and fixed by arranging distinguishable marks in a transparent raw material and the transparent camera calibration tool according to claim 8.

11. A composite camera calibration tool rendered by combining, in a state where relative positions are fixed, the transparent calibration tool,
   wherein a plurality of indicator points is spatially distributed and fixed by arranging distinguishable marks in a transparent raw material, wherein the distinguishable marks employ a specified color filter, and the transparent camera calibration tool according to claim 8.

12. A camera calibration method, comprising the steps of:
   installing the transparent calibration tool according to claim 8 in front of a camera in a stationary state in a world coordinate system;
   manipulating the indicators to be displayed by means of the light of an excitation beam; and
   estimating camera parameters from an image of the indicator points.

13. A stereo camera calibration method, comprising the steps of:
   disposing the transparent camera calibration tool according to claim 8 in front of two cameras arranged in different positions, in already-known positional relationships in a world coordinate system; and
   estimating parameters of the two cameras from an image of the indicators of the transparent camera calibration tool.

14. A transparent camera calibration tool, said transparent camera calibration tool comprising:
   a frame having a front face and a rear face, said front face and said rear face are separated by a predetermined distance, and
   a plurality of indicator points formed, as a group of intersecting points of thin wires rendered by extending a plurality of parallel thin wire groups in different axial directions, on said front face and said rear face of said frame,
   wherein at least the two sets of indicator points at the front and rear face of said frame are arranged in a non-coplanar relationship separated by said predetermined distance and having different angular orientation with respect to each other, and
   wherein said plurality of indicator points are located on a transparent plate having an upper surface disposed with a fluorescent material and a light source that irradiates an excitation beam, is spatially distributed and fixed.

15. A stereo camera calibration method, comprising the steps of:
   disposing, in front of two cameras that are arranged in different positions, a composite calibration tool, which is rendered by combining the transparent camera calibration tool according to claim 14 and another transparent camera calibration tool in a state in which relative positions are fixed, in a stationary state in a world coordinate system; and
   estimating parameters of the two cameras from a captured image of points at which four or more light beams irradiated by one light source intersect a transparent plate and an indicator image of the other transparent calibration tool.

16. A multi-view stereo camera calibration method, comprising the steps of:
   combining and disposing, in front of a plurality of cameras arranged in different positions, a composite calibration tool, which is rendered by combining the transparent camera calibration tool according to claim 14 and another transparent camera calibration tool in a state in which relative positions are fixed, in a stationary state in a world coordinate system so that, for either plate tool, four or more light beams irradiated by one light source intersect at least one other plate tool; and
   estimating the combined camera parameters from a captured image of the intersecting points and an image of the indicators of the other transparent calibration tool.

17. A camera calibration method, comprising a step of estimating camera parameters by using two cameras in a relationship in which relative positions are already known, and by focusing one camera on an object for observation purposes and focusing the other camera on a transparent calibration tool in which a plurality of indicator points is spatially distributed and fixed for calibration purposes, said observed image and said calibrated image are obtained simultaneously without removing said transparent calibration tool.

18. A camera calibration method, comprising:
   a step of estimating camera parameters by using one multi-focus camera, a focus of said one multi-focus camera is adjusted to a remote object and to a transparent calibration tool, said transparent calibration tool is installed in a close position directly in front of said one multi-focus camera,
   wherein said transparent calibration tool includes a plurality of indicator points that are spatially distributed and fixed, and said one multi-focus camera obtains an observed image via the focal point corresponding to the focus of the remote object and a calibrated image via the focal point corresponding to the focus at the close position of said transparent calibration tool, said observed image and said calibrated image are obtained simultaneously without removing said transparent calibration tool.

19. The camera calibration method according to claim 18, wherein the one multi-focus camera has a zoom function and the camera parameters are estimated in accordance with changes in the zoom.

* * * * *